United States Patent [19]

Yamamoto

[11] Patent Number: 5,730,656
[45] Date of Patent: Mar. 24, 1998

[54] VISCOUS RESISTANCE GENERATION MECHANISM

[75] Inventor: Kozo Yamamoto, Daito, Japan

[73] Assignee: Exedy Corporation, Osaka, Japan

[21] Appl. No.: 691,722

[22] Filed: Aug. 5, 1996

[30] Foreign Application Priority Data

Aug. 8, 1995 [JP] Japan ................... 7-202059

[51] Int. Cl.$^6$ .................................................. F16D 3/80
[52] U.S. Cl. ................... 464/24; 464/68; 192/208
[58] Field of Search ................... 464/29, 68, 27, 464/66; 192/55.4, 208

[56] References Cited

U.S. PATENT DOCUMENTS

| | | | |
|---|---|---|---|
| 5,017,179 | 5/1991 | Hanke et al. | 464/68 X |
| 5,072,818 | 12/1991 | Kuhne | 192/208 |
| 5,097,722 | 3/1992 | Fukushima | 464/68 X |
| 5,180,044 | 1/1993 | Fukushima et al. | 192/208 |
| 5,194,045 | 3/1993 | Hanke | 464/24 |
| 5,353,664 | 10/1994 | Yamamoto | 192/208 X |

FOREIGN PATENT DOCUMENTS 3901467  6/1990  Germany .................... 464/24

*Primary Examiner*—Daniel P. Stodola
*Assistant Examiner*—William A. Rivera
*Attorney, Agent, or Firm*—Shinjyu Office of Patent Attorneys

[57] ABSTRACT

A viscous resistance generation mechanism includes a first flywheel, a plurality of sliders and a driven plate. The first flywheel includes an arcuate fluid filled chamber, with the plurality of sliders disposed within the fluid filling chamber and movable in the circumferential direction. The driven plate is formed with a plurality of protrusion which are inserted into each of the plurality of sliders. The plurality of sliders are connected to the driven plate, and the interior of each of said sliders is sealed from the fluid filled chamber. Small torsional vibrations are dampened by large gaps between the fluid filled chamber and the plurality of sliders, and large torsional vibrations are dampened by small gaps between the plurality of protrusions and the interior of each of the plurality of sliders.

20 Claims, 5 Drawing Sheets

5,730,656

VISCOUS RESISTANCE GENERATION MECHANISM

BACKGROUND OF THE INVENTION

1. Field of the Invention

The present invention relates to a viscous resistance generation mechanism in a flywheel assembly, and more particularly to a viscous resistance generation mechanism that generates a viscous resistance in response to torsional vibrations.

2. Description of the Related Art

Flywheel assemblies used with automobile engines are disposed between an engine of the automobile and a transmission. The flywheel assembly includes a first flywheel and a second flywheel, a driven plate that rotates integrally with the second flywheel, and an elastic coupling mechanism that elastically connects the first flywheel and the driven plate circumferentially. The first flywheel is connected to a crankshaft of the engine, and a clutch is coupled to the transmission and is engagable with the second flywheel.

These types of flywheel assemblies may also include a viscous dampening mechanism. Viscous dampening assemblies are well-known in the art, a good example of which can be found in U.S. Pat. No. 5,180,044. This reference shows a viscous dampening mechanism at least partially disposed in an annular fluid chamber formed between both flywheels. Two chokes are formed in the fluid chamber of the viscous dampening mechanism which allows the passage of fluid in response to relative rotation between the first flywheel and second flywheel viscous resistance occurs when fluid passes through the chokes and dampens torsional vibrations.

The annular fluid chamber is disposed on a radially outer portion of the driven plate. The fluid chamber is generally U-shaped, and includes an opening which extends through its inner circumferential surface. A pair of annular projections are formed at a radially inner portion of the fluid chamber, with the annular projections engageable with a pair of annular grooves formed on a radially outer portion of the driven plate. The projections and the grooves act as a seal to prevent fluid from leaking out of the fluid chamber.

The fluid chamber includes a number of separate pieces. Each piece includes a stopper portion on each end thereof, and when the pieces of the fluid chamber are assembled, the stopper portions will be fitted together and thereby form a plurality of stopper portions within the fluid chamber.

A plurality of projections are formed along the outer circumference of the driven plate, and the outer peripheral edge of the driven plate is inserted into the fluid chamber from the inner peripheral side thereof. Cap-shaped sliders are disposed within the fluid chamber, with the projections on the driven plate being inserted into the sliders. The sliders can freely move circumferentially within an established range relative to the protrusions of the driven plate.

This fluid chamber further includes a first choke formed between an outer portion of the protrusions and an inner portion of the slider, and a second choke formed between an outer portion of the driven plate and an inner portion of the stoppers. In this type of fluid chamber, the first choke is wider than the second choke.

With this type of flywheel, torque fluctuations in the engine of a vehicle are transferred to the first flywheel as torsional vibrations. When a small torsional vibration is transmitted to the first flywheel, the sliders rotate together with the first flywheel and relative to the driven plate. The first choke restricts the flow of fluid within the fluid chamber and dampens these small vibrations. When a large torsional vibration is transmitted to the flywheel, the slider comes into contact with the protrusions on the driven plate and is then moved toward one of the stoppers. As a result, the flow of fluid is restricted through the second choke and causes a large viscous resistance, thereby dampening these large vibrations.

However, these types of flywheels have a drawback due to the fact that a separate fluid chamber must be installed. Because these types of fluid chambers often consists of many different parts, it increases production costs and makes assembly more complicated.

SUMMARY OF THE INVENTION

It is therefore an object of the present invention to provide a viscous resistance generation mechanism in which the number of parts are reduced while maintaining the same level of torsional dampening.

According to a first aspect of the present invention, a flywheel assembly includes a first flywheel with an annular wall formed on its outer periphery, a seal plate fixed to an outer radial surface of the annular wall and extending radially inwardly therefrom, the seal plate and the first flywheel at least partially defining an annular space therebetween.

The flywheel assembly also includes a driven plate arranged to rotate freely relative to the first flywheel within the annular space, with the driven plate including a plurality of spaced apart protrusions on its outer radial surface. An elastic coupling mechanism is disposed within the annular space which elastically connects the first flywheel and the driven plate.

A fluid filled chamber is defined within an outer periphery of the annular space, with the protrusions extending into the fluid filled chamber. A plurality of radially spaced apart stoppers are formed integrally with the first flywheel, the stoppers extending into said fluid filled chamber. A plurality of sliders are also included, each slider having a hollow interior and disposed between each adjacent pair of the stoppers. Each of the protrusions extend into each of the sliders, and the sliders are configured to slide circumferentially within the fluid filled chamber between the adjacent stoppers. The hollow interior of each of the sliders is sealed from the fluid filled chamber.

According to another embodiment of the present invention, a first gap formed between an outer circumferential portion of the plurality of sliders and an inner circumferential wall of the fluid filled chamber, and a second gap formed between an outer portion of the plurality of protrusions on the driven plate and an inner portion of the plurality of sliders. The second gap is smaller than said first gap, with the first gap dampening torsional vibrations within a predefined range, and the second gap dampening torsional vibrations larger than those within the predefined range.

According to yet another embodiment of the present invention, the driven plate further includes a groove disposed on an outer circumferential surface of both axial sides of the driven plate.

According to yet another embodiment of the present invention, the plurality of sliders include two protrusions which engage with the grooves in the driven plate.

According to yet another embodiment of the present invention, each of the plurality of sliders is formed from two separate members.

According to yet another embodiment of the present invention, the first gap is defined by the outer portion and two side surfaces of each of the plurality of sliders, and the inner walls of the fluid filled chamber.

Other objects, features, aspects and advantages of the present invention will be apparent from the following detailed description of the present invention when taken in conjunction with the accompanying drawings, in which like reference numerals designate the same or similar parts throughout.

DETAILED DESCRIPTION OF THE PREFERRED EMBODIMENTS

Figure 1:
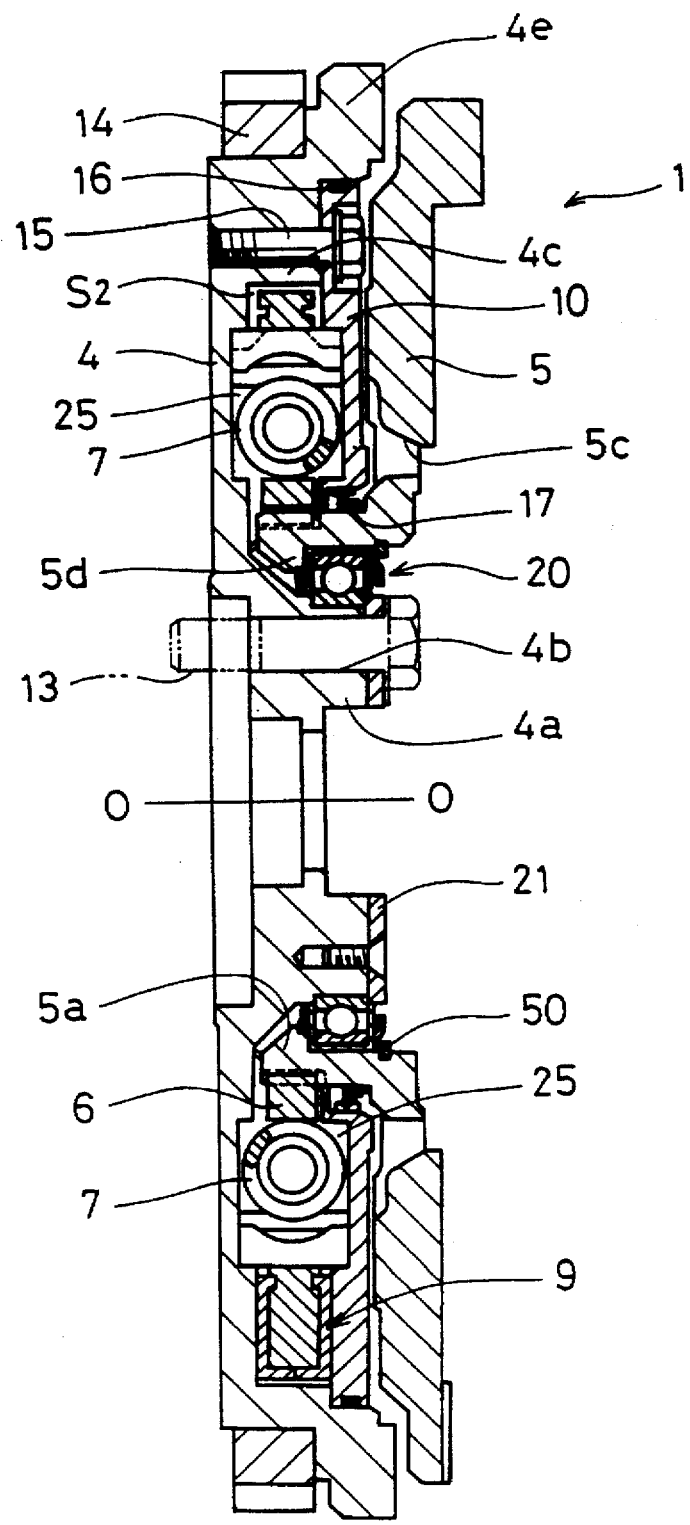
FIG. 1 is a fragmentary, side section of a flywheel assembly according in accordance with a first embodiment of the present invention.

FIG. 1 shows a flywheel assembly 1 in accordance with one embodiment of the present invention. The flywheel assembly 1 transmits torque from an engine disposed on the left side in FIG. 1 (not shown), to a transmission disposed on the right side in FIG. 1 (not shown).

The flywheel assembly 1 includes a first flywheel 4, a second flywheel 5, a driven plate 6, a plurality of coil springs 7 and a viscous resistance mechanism 9. The first flywheel 4 is fixed to an end of a crank shaft (not shown) with bolts 13. The second flywheel 5 has a friction surface on a side facing the transmission.

The first flywheel 4 is an annular member, the inner circumferential portion of which includes an cylindrical portion 4a, and the outer circumferential portion of which includes a rim portion 4e. An annular recess is defined between the outer circumferential side of the cylindrical portion 4a and the inner circumferential portion 4e, with the driven plate 6, the coil spring 7, the viscous resistance mechanism 9 accommodated in that annular recess. A ball bearing 20 is partially supported by the outer circumference of the cylindrical portion 4a. The ball bearing 20 is of the lubricating oil sealing type, in which seal members are disposed on both sides thereof. A ring gear 14 is fixed onto the outer circumference of the first flywheel 4.

The second flywheel 5 is an annular member, the inner circumferential side of which includes a cylindrical portion 5a supported by the ball bearing 20. The outer race of the ball bearing 20 is clamped between a flange portion 5d formed on the cylindrical portion 5a and a snap ring 50 fixed onto the second flywheel 5. The inner circumferential portion of the second flywheel 5 includes a plurality of holes 5c.

The seal plate 10 is an annular member, and its outer periphery is fixed to a stopper portion 4c (to be described later) disposed on the first flywheel 4. The inner circumferential portion of the seal plate 10 extends to the vicinity of the outer circumference of the cylindrical portion 5a. A space defined by the seal plate 10, the first flywheel 4 and the cylindrical portion 5a of the second flywheel 5 is filled with a viscous fluid. A first seal member 16 is disposed between the rim portion 4e and the outer circumferential portion of the seal plate 10, and a second seal member 17 is disposed between the inner circumferential portion of the seal plate 10 and the outer circumferential portion of the cylindrical portion 5a of the second flywheel 5.

Figure 3:
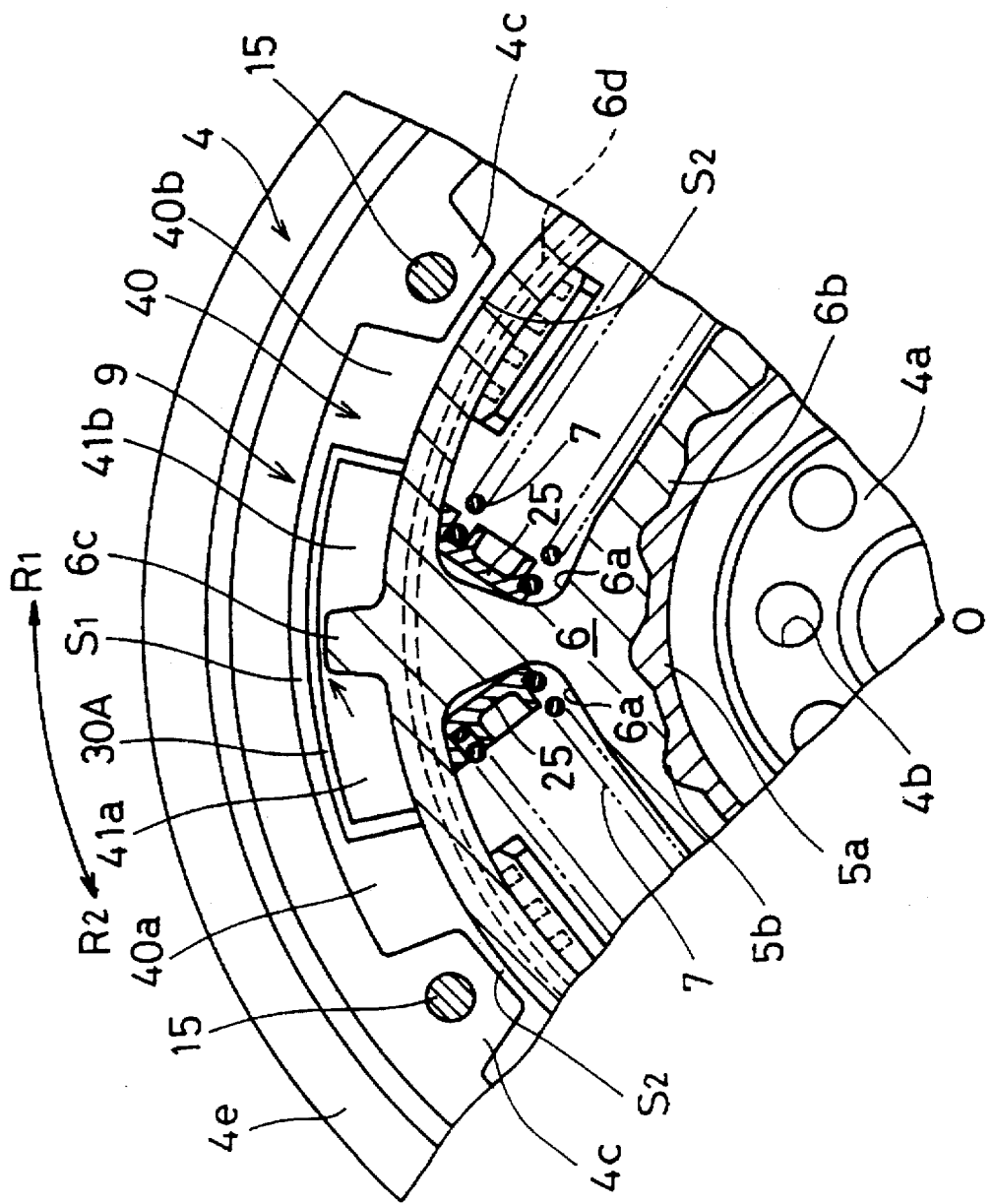
FIG. 3 is a fragmentary, frontal view of a portion of the flywheel assembly depicted in FIG. 1, showing portions of the viscous dampening mechanism.

The driven plate 6 is an annular member and disposed between the first flywheel 4 and the seal plate 10. As shown in FIG. 3, a first engagement portion 6b is formed on an outer circumferential portion of the driven plate 6, and engages with a second engagement portion 5b formed in the inner circumferential side of the cylindrical portion 5a of the second flywheel 5, thereby allowing the driven plate 6 to be rotated integrally with the second flywheel 5. The driven plate 6 includes a plurality of window holes 6a, with a plurality of coil springs 7 being accommodated therein. The coil springs 7 abut against both circumferential end surfaces of the window hole 6a through spring seats 25. The spring seat 25 abuts against both circumferential end surfaces of the window hole 6a in a manner which places the plurality of coil springs 7 in a deflective state. The spring seats 25 of the coil springs 7 also abut against the first flywheel 4 and a protrusion (not shown) formed on the seal plate 10.

Both axial sides of the driven plate 6 include annular grooves 6d, which are formed on an outer circumferential surface thereof. A plurality of engagement protrusions 6c are formed on an outer circumferential surface of the driven plate 6 and extend radially outward.

A description of the viscous resistance mechanism 9 will now be given.

Figure 4:
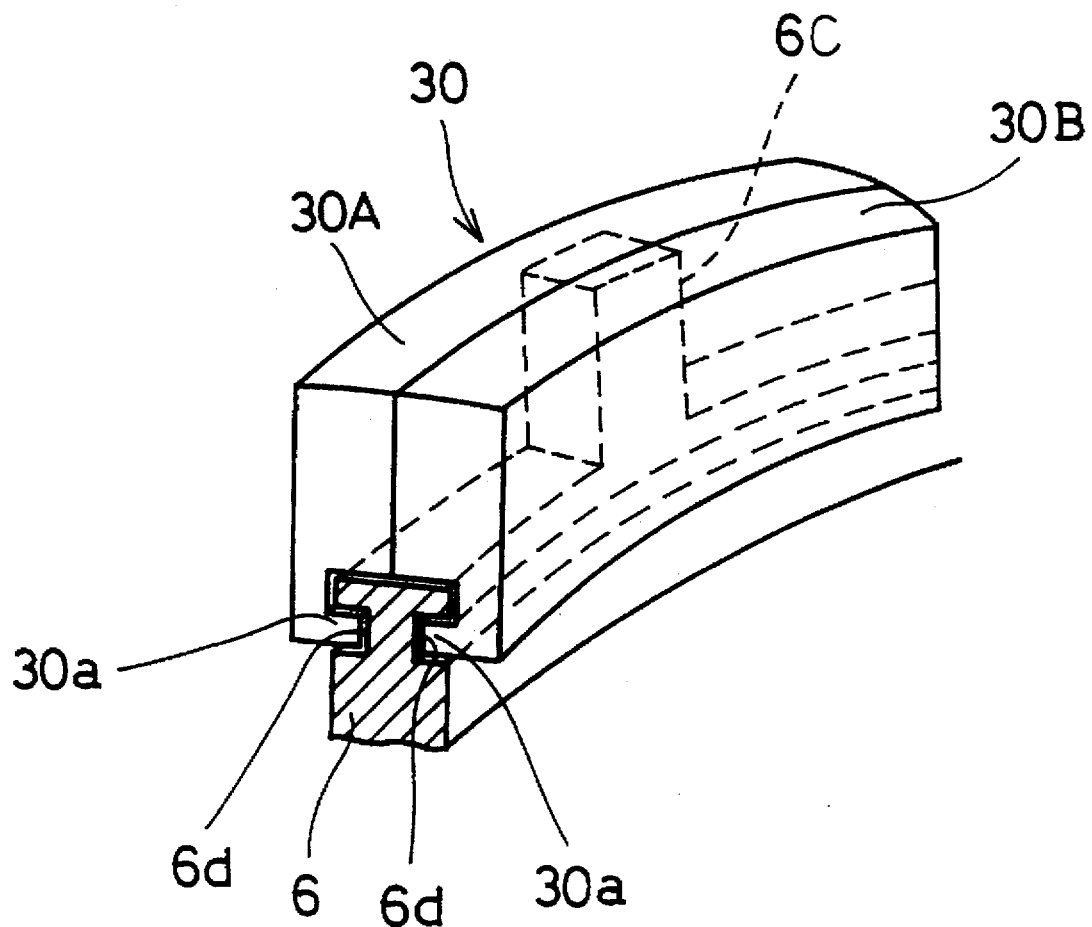
FIG. 4 is a fragmentary, perspective view of a portion of the flywheel assembly depicted in FIG. 1, showing a slider and a driven plate engaged with each other.

A plurality of stopper portions 4c are formed on the inner peripheral side of the rim portion 4e of the first flywheel 4 and protrude radially inward. A plurality of arc-shaped fluid chambers 40 are formed between the stopper portions 4c. As can be seen in FIGS. 3 and 4, a plurality of cap-shaped sliders 30 are disposed within the fluid chamber 40. Each slider 30 includes a pair of members 30A and 30B, and a pair of engagement protrusions 30a which are formed on the inner circumferential side of the slider 30 and extend axially. The engagement protrusions 30a are engagable with the annular grooves 6d formed in the driven plate 6. When each slider 30 is fitted to the outer circumference of the driven plate 6, the inside of the slider 30 is sealed with an engagement protrusion 6c disposed therein.

As shown in FIG. 3, the fluid chamber 40 is divided into a first sub-chamber 40a and a second sub-chamber 40b. The first sub-chamber 40a and the second sub-chamber 40b communicate with each other through a large gap S1, which is defined as a space between an outer circumferential surface of each slider 30 and an inner circumferential surface of the rim portion 4e of the first flywheel 4. As shown in FIGS. 1 and 3, the adjacent fluid chambers 40 communicate with each other through a large gap S2, defined as a space between the inner circumferential surface of each of the stopper portions 4c, the outer circumferential surface of the driven plate 6, and the outer circumferential portions of both side surfaces of the driven plate 6 and the first flywheel 4 and the seal plate 10.

Figure 2:
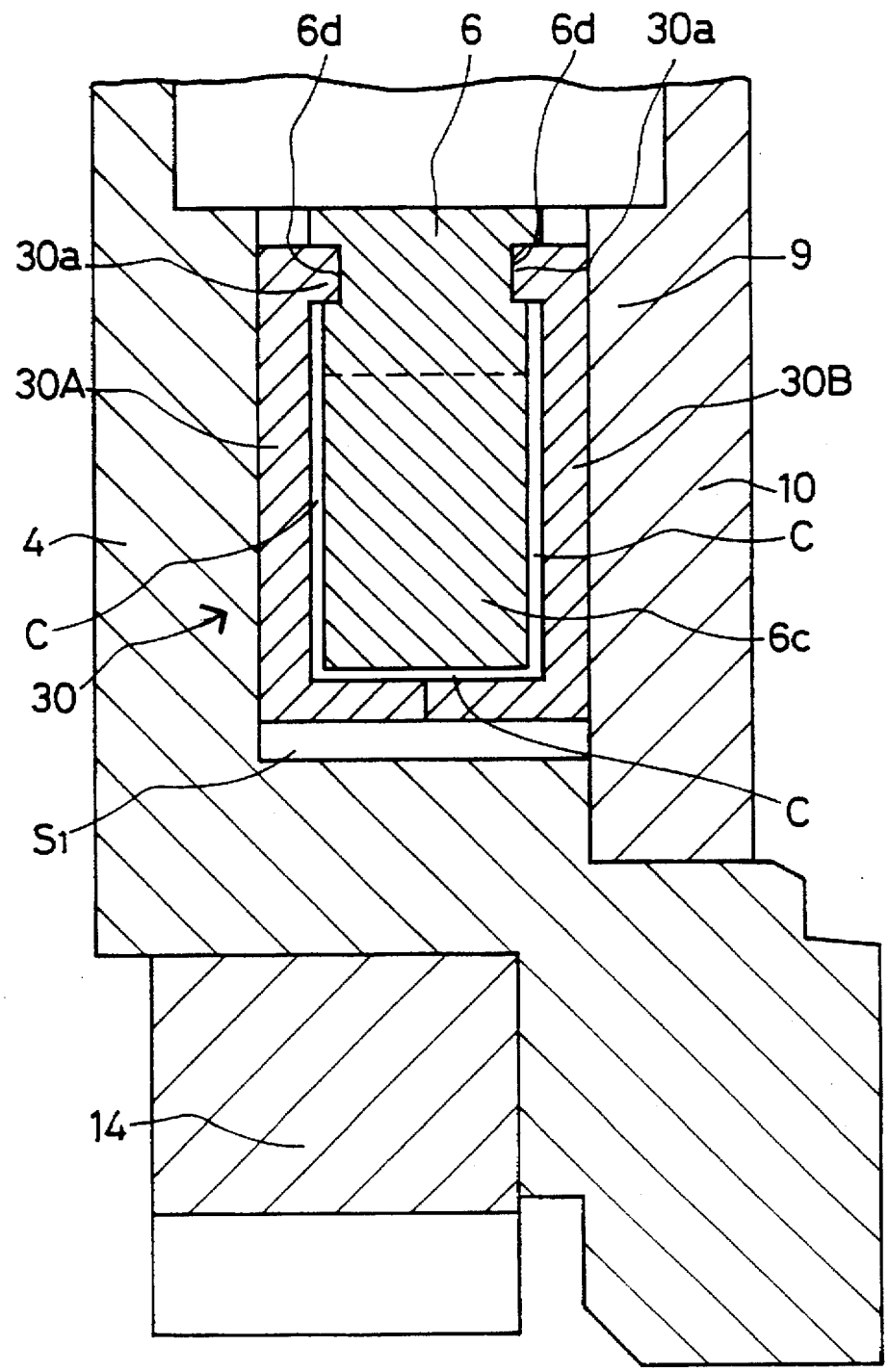
FIG. 2 is a fragmentary, side section of a portion of the flywheel assembly shown in FIG. 1, showing an enlarged view of a viscous dampening mechanism.

The inside of each of the sliders 30 is divided into a third sub-chamber 41a and a fourth sub-chamber 41b by each engagement protrusion 6c of the driven plate 6. The third sub-chamber 41a and the fourth sub-chamber 41b, as shown in FIG. 2, are communicable with each other through a small gap C defined between the outer circumferential surface and both side surfaces of the engagement protrusion 6c and the inner surface of each slider 30.

The operation of the viscous resistance mechanism in accordance with this embodiment will be now be described.

Torque from the crank shaft is transmitted to the first flywheel 4, and then to the first flywheel 4 and the seal plate 10 to the second flywheel 5 through the coil spring 7 and the driven plate 6. Upon the transmission of torsional vibrations from the engine, the first and second flywheels 4 and 5 are periodically rotated relative to each other. In this operation, the coil spring 7 is repeatedly compressed. When the coil springs are compressed, a viscous resistance is generated by the viscous resistance mechanism 9.

When the torsional vibrations are small, for example when the vehicle is idling or gently accelerating and decelerating, each slider 30 is rotated together with the driven plate 6 but relative to the first flywheel 4 and the seal plate 10. When this occurs, viscous fluid will flow between the first and second sub-chambers 40a and 40b through the large gap S1. Viscous fluid will also flow from the smaller sub-chamber into the adjacent fluid chamber 40 through the large gap S2. In this example, because the viscous fluid is flowing through relatively large gaps, the amount of resistance generated is small. It is preferable that the viscous resistance is limited to a minimum, because when the amount of torsional vibration is small only a low level of torsional dampening is required.

When torsional vibrations are large, for example during sudden acceleration, an end portion of each slider 30 abuts against the stopper portion 4c of the first flywheel 4, and then a relative rotation is produced between each engagement protrusion 6c and each slider 30. When this occurs, the viscous fluid passes between the third sub-chamber 41a and the fourth sub-chamber 41b through the small gap C and a large viscous resistance is generated.

Because large torsional vibrations are dampened by the small gap C disposed within the sliders 30, the complicated fluid chamber assembly present in the prior art is not required. Since this feature is omitted, the number of parts required decreases and the structure is thereby simplified. This significantly reduces manufacturing costs.

Furthermore, the engagement protrusions 30a on each slider 30 are inserted into the annular groove 6d of the driven plate 6, thereby sealing the inside of the sliders 30. Therefore, no additional seal member is required, and the number of parts required is not increased.

Figure 5:
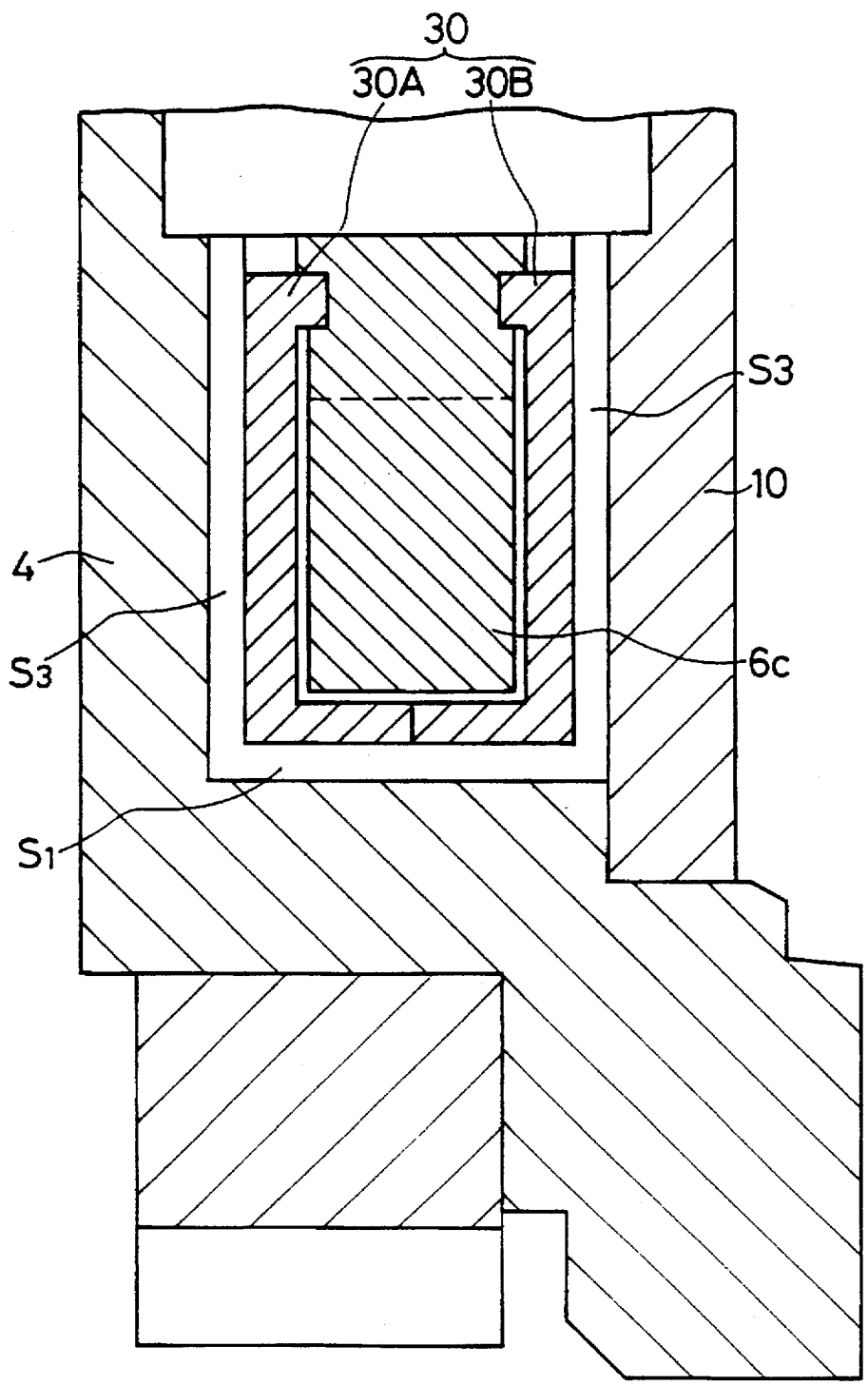
FIG. 5 is a fragmentary, side section of a portion of the flywheel assembly, similar to that shown in FIG. 2, in accordance with a second embodiment of the present invention.

FIG. 5 shows another embodiment of the present invention. In this embodiment, an addition gap S3 is provided on both outer axial sides of each slider 30. This additional gap allows a greater amount of viscous fluid to flow between first sub-chamber 40a and second sub-chamber 40b. This allows the viscous resistance mechanism to effectively dampen even small levels of torsional vibration.

The viscous resistance mechanism according to the present invention is not limited to the flywheel assembly of the above-mentioned embodiment, and is applicable to other damper mechanisms such as a torque convertor lock-up clutch or a clutch disc assembly.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A flywheel assembly comprising:

a first flywheel with an annular wall formed on its outer periphery;

a seal plate fixed to said annular wall and extending radially inwardly from said annular wall, said seal plate and said first flywheel at least partially defining an annular space therebetween, and an outer periphery of said annular space defining a plurality of arcuate chambers;

a driven plate arranged to rotate freely relative to said first flywheel within said annular space, said driven plate including a plurality of spaced apart protrusions on an outer circumferential surface, each of said protrusions extending into a corresponding one of said arcuate chambers;

a second flywheel fixed to said driven plate;

an elastic coupling mechanism disposed within said annular space elastically connecting said first flywheel and said driven plate;

a plurality of circumferentially spaced apart stoppers formed integrally with said first flywheel, said stoppers extending into said annular space, said stoppers at least partially defining said arcuate chambers; and a plurality of sliders, each of said sliders having a hollow interior filled with viscous fluid and disposed between each adjacent pair of said stoppers within a corresponding one of said arcuate chambers, each of said protrusions extending into said hollow interior of a corresponding one of said sliders, and said sliders configured to slide circumferentially within said arcuate chamber between said adjacent stoppers;

wherein said hollow interior of each of said sliders is sealed from said arcuate chamber.

2. A flywheel assembly according to claim 1, further comprising:

a first gap formed between said plurality of sliders and said fluid filled chamber; and a second gap formed between said plurality of protrusions on said driven plate and an inner portion of said plurality of sliders, said second gap smaller than said first gap;

wherein said first gap dampens torsional vibrations within a predefined range, and said second gap dampens torsional vibrations larger than those within said predefined range.

3. A flywheel assembly according to claim 2, wherein said first gap is defined by an outer portion and two side surfaces of each of said plurality of sliders, and inner walls of said arcuate chamber.

4. A flywheel assembly according to claim 1, wherein said driven plate further includes a groove disposed on an outer circumferential surface of both axial sides of said driven plate.

5. A flywheel assembly according to according to claim 4, wherein said plurality of sliders include two protrusions which extend into said grooves in said driven plate.

6. A flywheel assembly according to claim 1, wherein each of said plurality of sliders is formed from two separate members.

7. A flywheel assembly according to claim 1, wherein said arcuate chambers and said annular space are filled with a viscous fluid.

8. A viscous resistance generation mechanism comprising:

a pair of first disc plates fixed to each other at outer circumferential portions thereof, wherein said pair of first plates define an annular space;

a plurality of circumferentially spaced apart stoppers rotatable integrally with said first disc plates and dividing said outer radial portion of said annular space into arcuate chambers;

a second disc plate arranged within said annular space, said second disc plate rotatable relative to said first disc plates within a limited angle;

an elastic member disposed within said annular space, said elastic member elastically connecting said first disc plates and said second disc plate in the rotational direction; and a plurality of sliders disposed in said arcuate chambers, each of said sliders being disposed between adjacent pairs of said stoppers so as to be displaceable in the rotational direction relative to said first disc plates, said sliders being engaged with said second disc plate so as to be displaceable in the rotational direction relative to said second disc plate;

wherein a first fluid choke is formed between said first disc plates and each of said sliders, and a second fluid choke smaller than said first fluid choke is formed between said second disc plate and each of said sliders;

wherein each of said sliders has a hollow interior filled with said viscous fluid, each of said sliders is engaged with said second disc plate sealing said hollow interior from said annular chamber, and said second fluid choke is defined within said hollow interior of each of said sliders.

9. A viscous resistance generation mechanism according to claim 8, wherein each of said sliders is formed with an opening extending in a circumferential direction into which an outer periphery of said second disc plate extends.

10. A viscous resistance generation mechanism according to claim 9, wherein said second disc plate is formed with a plurality of protrusions extending from said outer periphery thereof into said sliders.

11. A viscous resistance generation mechanism according to claim 10, wherein said second disc plate is formed with an annular groove on an outer circumferential surface of both axial sides thereof, and each of said sliders is formed with two projections which are engaged with said annular grooves respectively so as to be moveable in the rotational direction relative to said second disc plate and seal the hollow interior of said slider.

12. A viscous resistance generation mechanism according to claim 11, wherein said second fluid choke is formed between said protrusions and each of said sliders.

13. A viscous resistance generation mechanism according to claim 12, wherein said sliders are sandwiched by said first disc plates in the axial direction, and said first fluid choke is formed between an outer peripheral surface of each of said sliders and an inner wall of said first disc plates.

14. A viscous resistance generation mechanism according to claim 13, wherein each of said sliders are formed from two members which are separable in the axial direction.

15. A mechanism according to claim 12, wherein each of said sliders are formed from a single member and said first choke includes spaces between said sliders and said first disc plates in the axial direction.

16. A viscous resistance generation mechanism according to claim 8, wherein said sliders are sandwiched by said first disc plates in the axial direction, and said first fluid choke is formed between an outer peripheral surface of each of said sliders and an inner wall of said first disc plates.

17. A viscous resistance generation mechanism according to claim 16, wherein each of said sliders are formed from two members which are separable in the axial direction.

18. A mechanism according to claim 8, wherein each of said sliders are formed from a single member, and said first choke includes spaces between said sliders and said first disc plates in the axial direction.

19. A viscous resistance generation mechanism according to claim 8, wherein said hollow interior of said sliders and said arcuate chambers are filled with a viscous fluid.

20. A viscous resistance generation mechanism according to claim 8, wherein said hollow interior of said sliders, said arcuate chambers and said annular space are filled with a viscous fluid.

* * * * *